United States Patent
Sayeed (10) Patent No.: US 6,594,320 B1
(45) Date of Patent: Jul. 15, 2003

(54) ORTHOGONAL FREQUENCY DIVISION MULTIPLEXED (OFDM) CARRIER ACQUISITION METHOD

(75) Inventor: Zulfiquar Sayeed, East Windsor, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/382,847

(22) Filed: Aug. 25, 1999

(51) Int. Cl.[7] ................................................. H04L 7/06
(52) U.S. Cl. ........................ 375/281; 375/326; 375/363; 375/364; 370/514; 370/482
(58) Field of Search ................................. 375/260, 362, 375/363, 364, 326; 370/482, 483, 514

(56) References Cited

U.S. PATENT DOCUMENTS

| | | | | |
|---|---|---|---|---|
| 6,208,695 B1 | * | 3/2001 | Klank et al. ................. | 375/260 |
| 6,246,735 B1 | * | 6/2001 | Sano et al. .................. | 370/514 |
| 6,356,748 B1 | * | 3/2002 | Namgoong et al. ....... | 455/190.1 |
| 6,381,251 B1 | * | 4/2002 | Sano et al. .................. | 370/480 |

OTHER PUBLICATIONS

P. H. Moose, "A Technique for Orthogonal Frequency Division Multiplexing Frequency Offset Correction," IEEE Transactions on Communications, vol. 42, No. 10, Oct. 1994, pp. 2908–2914.

J. van de Beek, M. Sandell and P. O. Borjesson, "ML Estimation of Time and Frequency Offset in OFDM Systems," IEEE Transactions on Signal Processing, vol. 45, No. 7, Jul. 1997, pp. 1800–1805.

L. Thibault, G. Soulodre and T. Grusec, "EIA/NRSC DAR Systems Subjective Test Part II: Transmission Impairments," IEEE Transactions on Broadcasting, vol. 43, Dec. 1997, pp. 353–364.

T. M. Schmidl and D. C. Cox, "Robust Frequency and Timing Synchronization for OFDM," IEEE Transactions on Communications, vol. 45, No. 12, Dec. 1997, pp. 1613–1621.

O. Edfors, M. Sandell, J. van de Beek, D. Landström and F. Sjöberg, "An Introduction to Orthogonal Frequency–Division Multiplexing," Sep. 1996.

* cited by examiner

Primary Examiner—Amanda T. Le (57) ABSTRACT

In all wireless systems, the first operation that must take place at the receiver is the acquisition of the carrier and timing. OFDM systems are particularly sensitive to carrier offsets since these can introduce inter-carrier interference and loss of signal power. An algorithm, termed modulo-sub-carrier (ModSC), which can estimate the local oscillator offset in a fast and efficient manner has been devised. The carrier offset can be brought to within one half the carrier spacing within 1 to 10 OFDM symbols. By inserting a null in the center carrier, carrier acquisition can be easily accomplished by locating this null in the FFT bins at the receiver. The offset of this null from the designed position indicates the local oscillator offset in units of number of sub-carriers. An additional carrier tracking algorithm is used to estimate the offset within one half the inter-carrier spacing. Together, the ModSC and carrier tracking algorithms completely estimate the local oscillator offset.

28 Claims, 5 Drawing Sheets

ORTHOGONAL FREQUENCY DIVISION MULTIPLEXED (OFDM) CARRIER ACQUISITION METHOD

FIELD OF THE INVENTION

This invention relates to Orthogonal Frequency Division Multiplexed (OFDM) wireless systems and, more particularly, to carrier acquisition techniques in OFDM systems.

BACKGROUND OF THE INVENTION

OFDM systems are becoming increasingly popular in broadcasting applications primarily because these systems are robust against multipath propagation effects. Since bandwidth capacity in these systems is limited, it is important to maximize such capacity by design. Currently, OFDM systems use additional pilot and/or synchronization signals to perform the initial acquisition of the carrier signal. In particular, one current technique uses training sequences over two consecutive OFDM symbols. However, this technique cuts into the OFDM capacity, and for systems where capacity is limited, this technique is inadequate. Another technique, known as the Beek-Sandell or Guard Interval Based (GIB) algorithm, is only able to distinguish within one half the inter-carrier spacing. This algorithm is thus insufficient for estimating greater offsets which normally occur at system startup. For example, in an OFDM system where the inter-carrier spacing is 4 KHz, the carrier is 2.3 GHz and the local oscillator has an accuracy of 8 parts per million (ppm), the GIB algorithm can only estimate a 2 KHz offset while greater offsets in the range of +/−16 KHz exist at system startup.

SUMMARY OF THE INVENTION

The above-identified problems are solved and a technical advance is achieved in the art by providing a method and system for acquiring a local oscillator carrier offset. An exemplary method includes receiving a signal having at least one spectral null inserted therein, locating a position of said spectral null in said signal, and using said position of said spectral null to estimate said local oscillator carrier offset. In contrast to the available technology, the present invention is a much simpler and efficient method of carrier acquisition for OFDM systems having a limited bandwidth. In particular, this technique does not require the use of additional pilot signals and thus optimizes the use of available bandwidth.

Carrier acquisition is accomplished in one embodiment of the present invention by estimating the initial local oscillator carrier offset that is present at system startup. Estimating the local oscillator carrier offset is accomplished by inserting a spectral null at the center of the transmit spectrum, locating the position of the null at the receiver and estimating the offset using the position of the null. The spectral null is inserted into the spectrum at the time when the Inverse Fast Fourier Transform (IFFT) is performed at the transmitter. At the receiver, after the Fast Fourier Transform (FFT) is performed, the received signal demonstrates a weaker signal at the location of the spectral null, which either moves to the right or the left due to the local oscillator carrier offset. Thus, knowing the inter-carrier spacing and the location of the null in the received spectrum correctly estimates the local oscillator carrier offset.

The present invention is applicable in all OFDM wireless or wireline systems, and in particular, digital radio in the USA, Europe and Japan. It is also applicable to asymmetrical digital subscriber-line (ADSL) technology.

Other and further aspects of the present invention will become apparent during the course of the following description and by reference to the attached drawings.

DETAILED DESCRIPTION OF THE INVENTION

The carrier acquisition method of the present invention is illustrated in connection with an exemplary OFDM system. The technology referred to as "OFDM" is usually viewed as a collection of transmission techniques and is well-known in the art. When applied in a wireless environment, such as radio broadcasting, the technology is referred to as OFDM. However, in a wired environment, the term discrete multi-tone (DMT) is more commonly used. Although described in connection with an exemplary OFDM system in a wireless environment, it will be understood that the method of the present invention is equally applicable to a DMT system in a wired environment. The functionality performed by the transmitter and receiver sections of an exemplary OFDM system are first described with reference to FIGS. 1 and 2, respectively. The carrier acquisition method of the present invention is then described with reference to FIG. 3.

Briefly, in the exemplary OFDM system, a digital signal is transmitted as a plurality of parallel sub-carriers (also known as "bins"). Collectively, these sub-carriers are referred to as an OFDM "symbol". However, only some of the sub-carriers of the OFDM symbol actually contain information about the signal. These sub-carriers are referred to herein as "active" sub-carriers; the remaining sub-carriers are nulled, or, in other words, are filled with zeroes, and thus, are referred to herein as "inactive" sub-carriers. An IFFT of a significantly longer length than the number of active sub-carriers is then used to encode the signal for transmission to an OFDM receiver. In particular, the IFFT length is maintained at twice the number of sub-carriers in order to properly reproduce the highest frequency sub-carriers and avoid the effects of aliasing.

The design parameters associated with the exemplary OFDM system include: total available bandwidth=F Hz; over-sampling rate=$O_s$; number of active sub-carriers=$N_a$; FFT length=$N*O_s$ sub-carriers; sampling duration=$t_s=(N_a/F)/(N*O_s)$ seconds; inter-carrier spacing=$F/N_a$ Hz; guard interval=$L*O_s$ samples; guard interval duration=$T_g=L*O_s*t_s$ seconds; useful symbol duration=$T_u=N_a/F$ seconds; and total symbol duration=$T_s=T_u+T_g$ seconds.

When selecting values for these parameters, several considerations should be borne in mind. First, the FFT length ($N*O_s$) is preferably limited such that the maximum expected Doppler rate of the OFDM system is smaller than the sub-carrier spacing (i.e., $F/N_a$) in order to minimize inter-carrier interference. Second, the FFT length is preferably much larger than the channel delay spread to minimize inter-symbol interference. Third, as mentioned above, the IFFT length is maintained at approximately twice the number of sub-carriers (hence 2×over-sampling) in order to properly reproduce the highest frequency sub-carriers and avoid aliasing effects. In addition, the guard interval duration ($T_g$) is preferably greater than the maximum expected delay spread of the channel to further minimize inter-symbol interference. Exemplary values for the foregoing system parameters are: F=3.904 MHz; $O_s$=2×over-sampling; $N_a$=976 sub-carriers; N=1024 sub-carriers; FFT Length= 2048 sub-carriers; $t_s$=122.1 nano-seconds; $F/N_a$=4 KHz; L=84; $T_g$=20.51 micro-seconds; $T_u$=250 micro-seconds; and $T_s$=270.5 micro-seconds; carrier frequency=2.3 GHz; local oscillator accuracy=8 ppm.

As will be discussed in detail hereinafter, a ModSC algorithm and a carrier tracking algorithm which can identify a local oscillator carrier offset within one half the inter-carrier spacing are used in accordance with the present invention to determine the local oscillator carrier offset. The ModSC algorithm is able to estimate large offsets that are multiples of the carrier spacing (4 KHz, 8 KHz, 12 KHz, etc. in the exemplary OFDM system) which may occur at system startup. Unlike the ModSC algorithm, the carrier tracking algorithm is able to detect the carrier offset and correct the local oscillator even when the spectral null moves to the middle of the sub-carrier spacing. (The ModSC algorithm disclosed herein has difficulty detecting the spectral null at such a location.) Thus, if the local oscillator moves the spectrum to the left or the right by one half the inter-carrier spacing (2 KHz in the exemplary OFDM system), the ModSC algorithm will not be able to detect the null at the output of the FFT. Once the offset moves sufficiently away from the middle of the sub-carrier separation, the ModSC algorithm can detect the integral part of the offset and remove the inherent ambiguity equal to the inter-carrier spacing (i.e, 4 KHz in the exemplary OFDM system) due to the 2*pi periodicity of the carrier tracking estimate. Therefore, the ModSC and carrier tracking algorithms work together in estimating the local oscillator carrier offset more quickly and with greater accuracy than the carrier tracking algorithm alone.

The GIB algorithm is one such carrier tracking algorithm that is able to estimate the local oscillator carrier offset within one half the inter-carrier spacing. (2 KHz in the exemplary OFDM system.) Accordingly, the GIB algorithm is the carrier tracking algorithm used in the exemplary OFDM system. This algorithm is well known in the art and is described by J. V. Beek et al., "ML Estimation of Time and Frequency Offset in OFDM systems," *IEEE Transactions on Signal Processing*, vol. 45, no. 7 (July 1997), pp. 1800–1805, which is incorporated herein by reference.

In the exemplary OFDM system, where the carrier is 2.3 GHz and the local oscillator accuracy is 8 ppm, carrier offsets are in the range of +/−16 KHz. In accordance with the carrier offset estimation method described herein, the OFDM transmitter places a spectral null in the center of the transmit spectrum. (Other spectral nulls may also be inserted within $N_a/2$ active sub-carriers on either side of the central null and spaced at distances at least 2 times the expected local oscillator carrier offset.) At the receiver, timing information, which is used to align the signal and extract the appropriate $N*O_s$ samples for the FFT operation, is extracted from the signal with a timing recovery algorithm. Alternatively, in the OFDM system disclosed herein, the GIB algorithm provides the necessary timing information thereby eliminating the need for a separate carrier timing recovery algorithm. After the FFT operation is completed, the null is located, and the sub-carrier where the null was found is the carrier offset of the local oscillator.

Figure 1:
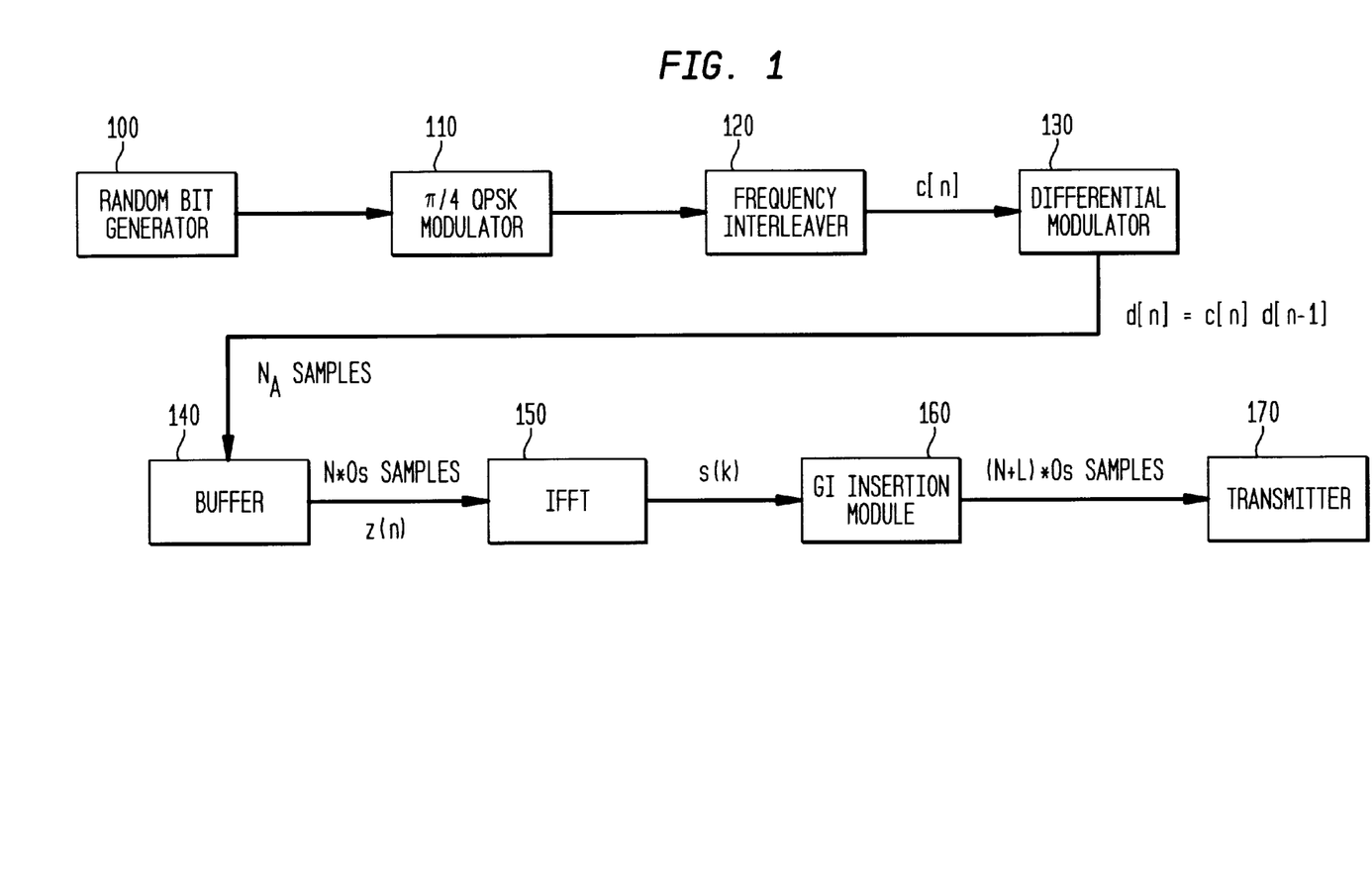
FIG. 1 is a block diagram illustrating an exemplary OFDM transmitter.

Referring now to the drawings wherein like reference numbers refer to like parts, FIG. 1 is a block diagram illustrating an exemplary OFDM transmitter. As shown in FIG. 1, a random bit generator 100 is used to generate a digital data stream (i.e., I and Q pairs). The I and Q pairs are fed to a Pi/4 QPSK modulator 110 which generates an active sub-carrier by mapping each I and Q pair to a QPSK constellation. Active sub-carriers from the modulator are then sent to a frequency interleaver 120 where they are frequency interleaved over one OFDM symbol (i.e., $N_a$ sub-carriers or, in the exemplary embodiment, 976 sub-carriers). In the exemplary embodiment, the frequency interleaver 120 comprises a matrix of R rows and C columns where R=61 and C=16 to accommodate the 976 active sub-carriers for each symbol. The sub-carriers are written into the matrix row by row and are read therefrom column by column to effect the interleaving. The output of the frequency interleaver 120 (c[n], where, in the exemplary embodiment, n=1 to 976 sub-carriers) is then fed to a differential modulator 130.

Figure 4A:
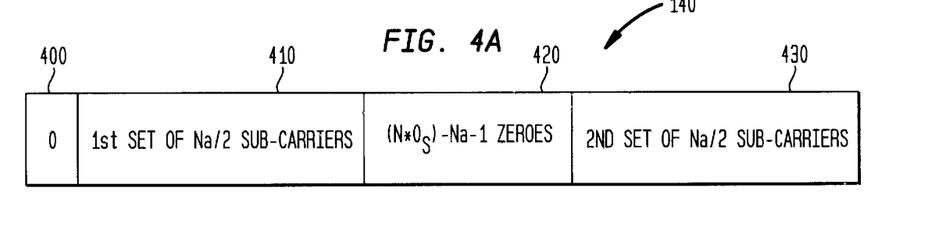
FIG. 4A illustrates an exemplary buffer containing an OFDM symbol.
Figure 4B:
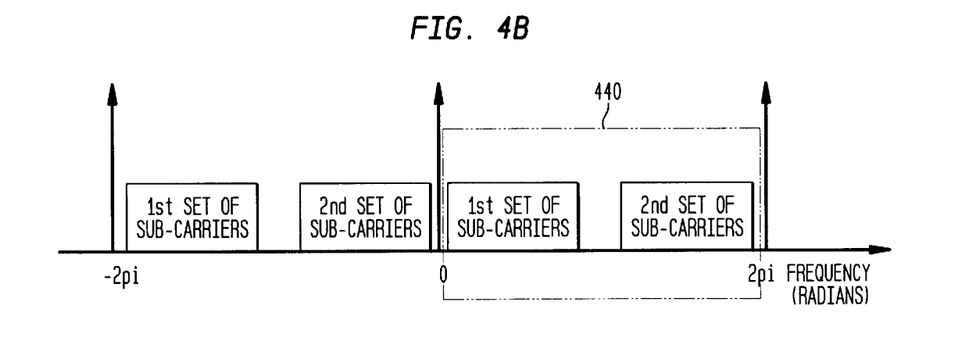
FIG. 4B illustrates the contents of the buffer of FIG. 4A in radian frequency.

The output of the differential modulator 130 comprises complex elements d[n]=c[n]d[n−1], where, in the exemplary embodiment, n=1 to 976 active sub-carriers. The output of the differential modulator 130 for each symbol is then sent to and stored in a buffer 140 of width equal to $N*O_s$ sub-carriers. Thus, in the exemplary embodiment, the buffer 140 is 2048 sub-carriers wide. An exemplary buffer having 0 to 2047 locations is illustrated in FIG. 4A. The spectral null is inserted at the center of the transmit spectrum by loading a zero complex value in the first location 400 in the buffer 140 (i.e., with z[0]=0). This null is used in the carrier acquisition method described herein. The next $N_a/2$ locations 410 in buffer 140 are loaded with the samples corresponding to the first set of $N_a/2$ active sub-carriers. The next $(N*O_s)-N_a-1$ locations 420 in buffer 140 are then padded with zeros corresponding to the inactive sub-carriers. As will be discussed hereinafter, the insertion of zeros in these locations of the buffer 140 will facilitate using a larger IFFT size than the number of active sub-carriers thereby ensuring that the highest frequency sub-carriers will be at least 2×over-sampled to eliminate the adverse effects of abiasing. Finally, the last $N_a/2$ locations 430 in the buffer 140 are loaded with samples corresponding to the remaining or second set of $N_a/2$ active sub-carriers. The contents of buffer 140 represents the OFDM symbol in the frequency domain. In radian frequency, the 0th sub-carrier corresponds to 0 radians and the $2047^{th}$ sub-carrier corresponds to 2 pi radians. This is illustrated by reference numeral 440 in FIG. 4B.

The contents of the buffer 140 are then transmitted to an IFFT 150 for conversion from the frequency domain to the time domain. The IFFT 150 is of length $N*O_s$. In the exemplary embodiment, N and $O_s$ are 1024 and 2×over-sampling, respectively. The output of the IFFT 150 is the time domain representation of the symbol as defined by:

$$s[k] = \sum_{n=-N_a/2}^{N_a/2} z[n] \cdot \exp(j \cdot 2\pi \cdot n/(N \cdot O_S))$$

Thus, the output of the IFFT 150 will be time domain samples for $N*O_s$ sub-carriers or, in the exemplary embodiment, samples for 2048 sub-carriers. As discussed above, however, d[n] will equal zero for n=0 and for each of the $(N*O_s)-N_a-1$ inactive sub-carriers. Next, the $N*O_s$ samples are sent to GI Insertion Module 160 where a guard interval of length $L*O_s$ is added to the symbol. The guard interval is an exact duplicate of the last $L*O_s$ samples of the OFDM symbol which gets prepended to the transmitted symbol. In the exemplary embodiment, the length L of the guard interval is 84 samples. Thus, the total length of the transmitted symbol is $(N+L)*O_s$ samples or, in the exemplary embodiment, 2,216 samples.

Figure 4C:
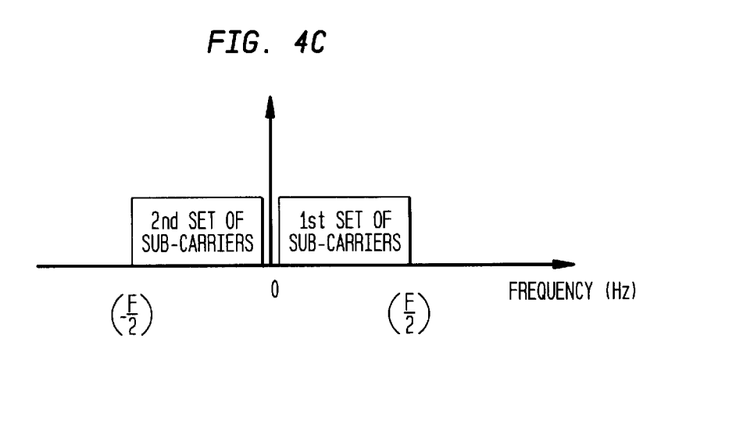
FIG. 4C illustrates an OFDM signal after digital-to-analog conversion and filtering.

Next, the symbol is sent to a transmitter which includes a digital-to-analog (D/A) converter operating at $F_s=N*(F/N_a)*O_s$ Hz (in the exemplary embodiment, 8.192 MHz) and is converted from digital to analog. The D/A converter imposes a sin x/x spectrum onto each sub-carrier. After D/A conversion, the $0^{th}$ sub-carrier of the symbol will be located at 0 Hz and extend to 4 KHz, and the $2047^{th}$ sub-carrier will be located at 8.188 MHz and extend to 8.192 MHz. However, as is well known in the art, a digital signal replicates itself every 2pi radians. Thus, the sample and hold function of the D/A converter will serve to filter out any replicas of the symbol and retain only that portion of the symbol extending from $-N*(F/N_a)$ Hz to $+N*(F/N_a)$ Hz (i.e., -4.096 MHz to +4.096 MHz in the exemplary OFDM system) for transmission to the OFDM receiver. However, the energy content of the inactive sub-carriers is almost zero. Thus, the active sub-carriers will be transmitted such that, as illustrated in FIG. 4C, the $0^{th}$ sub-carrier will be located at 0 Hz, the first set of $N_a/2$ sub-carriers will be located from 0 Hz to F/2 Hz and the second set of $N_a/2$ sub-carriers will be located at -F/2 Hz to 0 Hz.

Figure 2:
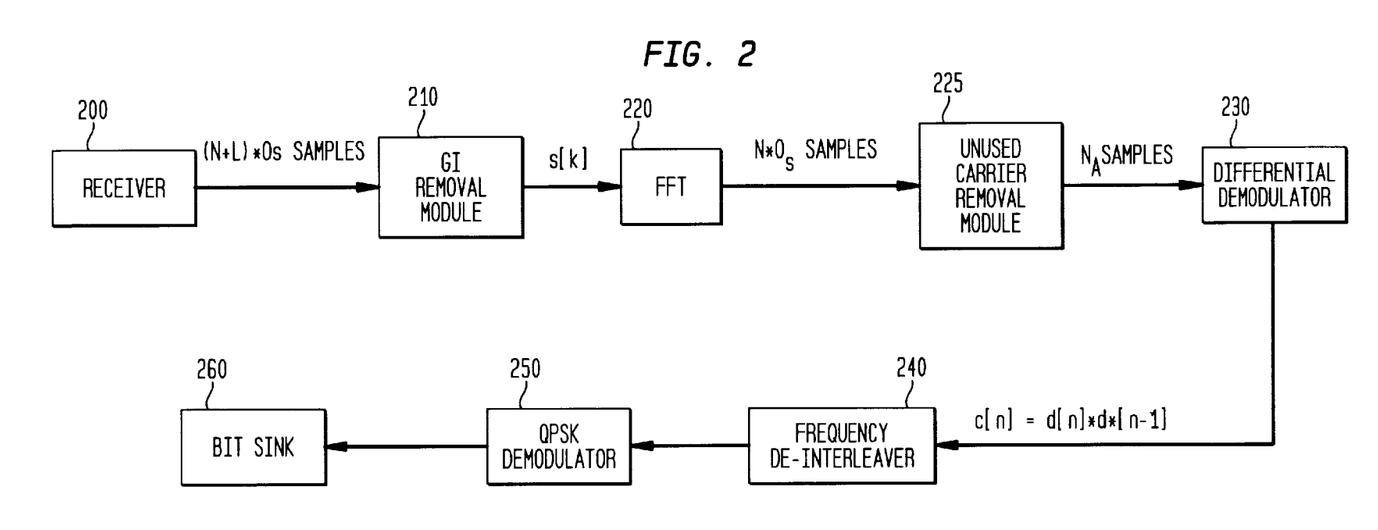
FIG. 2 is a block diagram illustrating an exemplary OFDM receiver.

FIG. 2 is a block diagram illustrating an exemplary OFDM receiver. It will be understood that, in a wireless system, the receiver may be located in a handset, a base station or the like. As shown in FIG. 2, samples corresponding to the sub-carriers of the OFDM symbol are received by receiver 200 and converted from analog to digital. Next, the guard interval is removed by GI Removal Module 210 to obtain $N*O_s$ sub-carriers. The symbol is then sent to an FFT 220 of length $L=N*O_s$ for conversion from the time domain to the frequency domain. As discussed above, for purposes of carrier acquisition, a null will be present in the center of the spectrum if the receiver is tuned to the transmit carrier. After the FFT is performed, the inactive sub-carriers are discarded by unused carrier removal module 225, and the complex elements d[n] are sent to a differential demodulator 230. Demodulation results in active sub-carriers c[n] d[n] d*[n-1]. The active sub-carriers are then sent to a frequency de-interleaver 240 and thereafter to a QPSK demodulator 250. After QPSK de-modulation, the digital bits are sent to a data sink 260 for application-specific processing.

Figure 5:
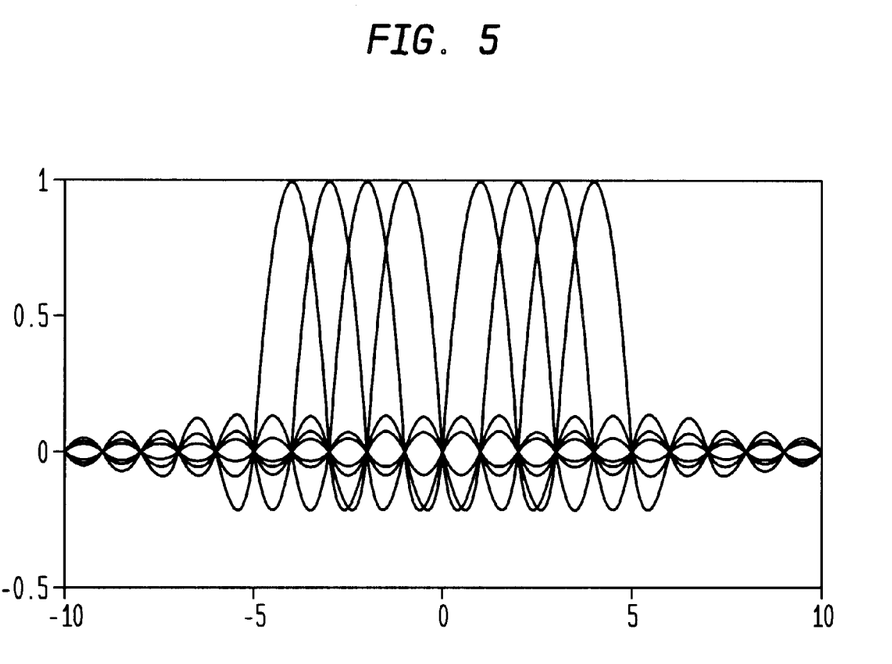
FIG. 5 illustrates the output spectrum of the transmitted signal.

FIG. 5 is a chart illustrating the output spectrum of a transmitted signal comprising the OFDM samples received at the receiver of FIG. 2. The x-axis denotes the frequency. Nine sub-carriers are shown with the spectral null in the central sub-carrier. In cases where there is a frequency offset of L*4 KHz, the spectral null will move from the central sub-carrier to the Lth sub-carrier.

Figure 3:
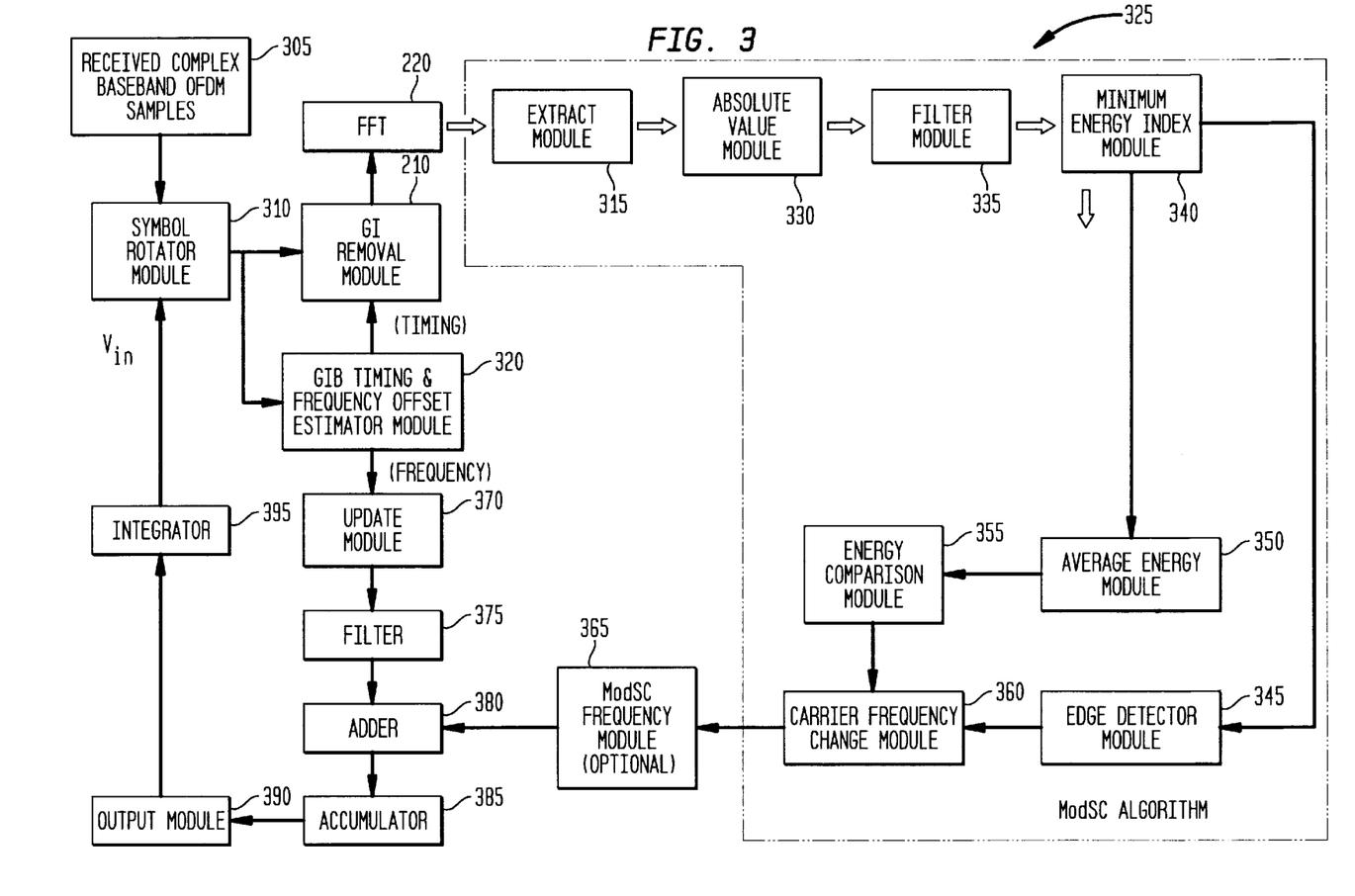
FIG. 3 is a block diagram illustrating the carrier acquisition method of the present invention.

FIG. 3 illustrates the OFDM carrier acquisition method of the present invention. As discussed above, it is used to estimate and correct the initial local oscillator carrier offset and to resolve receiver timing for the OFDM signal in the exemplary OFDM system. As shown in FIG. 3, the received complex baseband OFDM samples 305 are rotated by the integrated phase due to the local oscillator carrier offset in Symbol Rotator Module 310, which is represented in baseband as $e^{(j*V_{in})}$. These samples are then sent to the GI Removal Module 210 where the guard interval is removed. They are also fed to the GIB Timing & Frequency Offset Estimator Module 320, where the timing offset is calculated prior to initiating the carrier acquisition system. Calculation of the timing offset prior to carrier acquisition is possible since the GIB algorithm gives good estimates of the timing offset in the presence of very high local oscillator carrier offsets (up to 4 or 5 carrier spacings). After the timing information is extracted from the GIB Timing & Frequency Offset Estimator Module 320 and sent to the GI Removal Module 210, the samples are fed to the FFT 220, and the carrier acquisition process begins.

The first step in the ModSC algorithm 325 is the extraction of the appropriate number of sub-carriers in the Extract Module 315. The extracted FFT sub-carrier bins have integer indices with the central sub-carrier having an index of 0. For example, in a system where 9 sub-carriers are extracted, the sub-carrier bins would have the following indices: −4, −3, −2, −1, 0, 1, 2, 3, 4.

Once the extraction operation is completed, the extracted FFT bins can be observed to locate the null, which indicates the ModSC offset estimate. Specifically, the ModSC algorithm can only distinguish whether the local oscillator carrier offset is an integer, i.e., . . . −2, −1, 0, 1, 2 . . . , sub-carriers off, which is equivalent to . . . −8 KHz, −4 KHz, 0 KHz, 4 KHz, 8 KHz . . . in the exemplary OFDM system. While a per-sub-carrier based operation on all the available sub-carriers can be performed, it is unnecessary. The number of per-sub-carriers that are needed depends on the parts per million accuracy of the local oscillator and the carrier frequency. In the exemplary OFDM system where the local oscillator accuracy is 8 ppm, the per-sub-carrier operations can be constrained to sub-carriers: −4, −3, . . . 0, . . . 3, 4 because 2*M+1 sub-carrier tracking can generally estimate +/−M*(F/N) (Hz).

The absolute values of the extracted FFT outputs are then calculated on a per-sub-carrier basis in the Absolute Value Module 330. Because the location of the null is rendered uncertain by channel noise and fading, the extracted FFT outputs are preferably filtered on a per-sub-carrier basis to remove or mitigate the effects of the channel in the Filter Module 335. After the filtering operation, the sub-carrier with the least amount of energy is selected in the Minimum Energy Index Module 340 from the parallel outputs of the filter. This minimum energy sub-carrier index is then sent to the Edge Detector Module 345, which transmits the minimum energy sub-carrier index to the Carrier Frequency Change Module 360 when an edge is detected. In the Carrier Frequency Change Module 360, the minimum energy sub-carrier index is multiplied by the inter-carrier spacing (which is 4 KHz in the exemplary OFDM system) to determine the amount of carrier frequency change necessary. This is referred to herein as the ModSC offset estimate.

The Minimum Energy Index Module 340 also transmits the energy of the sub-carriers to the Average Energy Module 350, where the average energy of the remaining extracted FFT outputs (i.e., excluding the minimum energy sub-carrier) is calculated. The ratio of the average energy to the minimum energy is then compared to a pre-determined threshold in the Energy Comparison Module 355. When this ratio is greater than the pre-determined threshold and an edge is detected in the Edge Detector Module 345, the Carrier Frequency Change Module 360 reports the ModSc offset estimate to the Adder 380. Otherwise, the ModSC algorithm indicates no change in carrier frequency.

It may be desirable, however, to adjust the carrier frequency incrementally instead of all at once. Thus, a second threshold in the ModSC Frequency Module 365 may be used in determining how much to adjust the frequency calculated in the Carrier Frequency Change Module 360. For example, if the output of the Carrier Frequency Change Module 360 indicates that the carrier offset is 8 KHz, one may want to change the carrier frequency by 4 KHz instead of the entire 8 KHz. Thus, on the next pass through the ModSC and GIB algorithms, the carrier offset would only be 4 KHz off.

Returning to the GIB Timing & Frequency Offset Estimator Module 320, the frequency estimate therefrom is in the range of −0.5 to 0.5, where 0.5 corresponds to $F/(2*N_a)$ and −0.5 corresponds to $-F/(2*N_a)$ (2000 Hz and −2000 Hz, respectively, in the exemplary OFDM system). This GIB estimate is then sent through the Update Module 370, where it is multiplied by the pre-set update rate (Urate). A full scale update rate is $F/(2*N_a)$ (2000 in the exemplary OFDM system). For an update rate where only a portion of the estimate is used, the full scale update rate is multiplied proportionally. For example, if only 10% of the estimate is desired, $Urate=(0.1)*F/(2*N_a)=200$.

The output of the Update Module 370 proceeds through a Filter 375 to the Adder 380, where it is added to the ModSC offset estimate (received from the ModSC algorithm) in calculating the final carrier adjustment needed. This adjustment is then sent into an Accumulator 385, where the values coming into it are accumulated. The accumulation process is mathematically represented as $f(n)=f(n-1)+in(n)$, with $f(0)=0$. The accumulated values are then sent to the Output Module 390, where they are multiplied by $2*pi$ and divided by the sampling rate, $1/t_s$, of the system and then up sampled by the total length of the transmitted symbol. In the exemplary OFDM system, the sampling rate equals 8.192 MHz, the inputs are multiplied by $2*pi/8.192e6$ and the total length of the transmitted symbol is 2216. Thus, the Output Module 390 up-samples one sample to 2216 samples. These samples then proceed to the Integrator 395, where they are accumulated and added together. Thus, the output of the Integrator is expressed $$out(n) = \sum_{k=0}^{n-1} in(k).$$

The output is supplied to the Symbol Rotator Module 310 as $V_{in}$, referred to above. In accordance with the present invention, ModSC algorithm and GIB algorithm together can identify the total frequency offset more efficiently and accurately than a carrier tracking algorithm alone.

This technique is also suitable for fading multi-path channels. As is well-known, the coherence bandwidth is proportional to the inverse of the channel delay spread. For a well devised acquisition system, the 9 central sub-carriers (or fewer) can be assumed to experience almost the same fades, and therefore the comparison for the detection of the minimum energy sub-carrier can be made quite insensitive to the frequency response of the channel. In addition, the filtering operation that follows the FFT can be designed to mitigate the channel variability due to fading.

In sum, the OFDM carrier acquisition method and system of the present invention estimates the carrier offset quickly and accurately. The system does not require any additional synchronization symbols and employs the entire bandwidth to transmit information. In addition, it is a robust acquisition system which has been proven to work well in highly dispersive channels.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed is:

1. A method for acquiring a local oscillator carrier offset in a communications system comprising:

receiving a signal having at least one spectral null inserted therein;

locating a position of said spectral null in said signal; and using said position of said spectral null to estimate said local oscillator carrier offset.

2. The method according to claim 1, wherein said signal is an OFDM signal.

3. The method according to claim 1, wherein said signal is a DMT signal.

4. The method according to claim 1, wherein said steps of locating a position of said spectral null and using said position to estimate said local oscillator carrier offset includes;

extracting a plurality of sub-carriers of said signal after an FFT operation;

determining a minimum energy sub-carrier of said plurality of sub-carriers;

calculating an average energy of said plurality of sub-carriers, excluding an energy of said minimum energy sub-carrier;

comparing a ratio of said average energy and said energy of said minimum energy sub-carrier to a predetermined threshold;

multiplying an index of said minimum energy sub-carrier by an inter-carrier spacing to generate a result; and adding said result to a carrier tracking estimate.

5. The method according to claim 4, wherein said carrier tracking estimate is generated by a carrier tracking algorithm capable of identifying said carrier tracking estimate within one half the inter-carrier spacing.

6. The method according to claim 4, wherein said carrier tracking estimate is generated by a GIB algorithm.

7. The method according to claim 1, further comprising correcting for said local oscillator carrier offset.

8. The method according to claim 7, wherein said correcting is accomplished by changing a carrier frequency by said carrier offset.

9. The method according to claim 1, wherein said carrier offset is estimated by extracting a plurality of sub-carriers of said signal after an FFT operation;

determining a minimum energy sub-carrier of said plurality of sub-carriers;

calculating an average energy of said plurality of sub-carriers, excluding an energy of said minimum energy sub-carrier;

comparing a ratio of said average energy and said energy of said minimum energy sub-carrier to a first predetermined threshold;

multiplying an index of said minimum energy sub-carrier by an inter-carrier spacing to generate a result; and adding to a carrier tracking estimate a lesser of said result and a predetermined amount less than or equal to a second predetermined threshold.

10. The method according to claim 9, wherein said carrier tracking estimate is generated by a carrier tracking algorithm capable of identifying said carrier tracking estimate within one half the inter-carrier spacing.

11. The method according to claim 9, wherein said carrier tracking estimate is generated by a GIB algorithm.

12. A method for enabling a receiver to acquire a local oscillator carrier offset comprising:

transmitting a signal having at least one spectral null inserted therein for use by a receiver in acquiring a local oscillator carrier offset.

13. The method according to claim 12, wherein said signal is an OFDM signal.

14. The method according to claim 12, wherein said signal is a DMT signal.

15. A communications system comprising:

a receiver for receiving a signal having at least one spectral null inserted therein;

means for locating a position of said spectral null in said signal; and means for using said position of said spectral null to estimate said local oscillator carrier offset.

16. The communications system according to claim 15, wherein said signal is an OFDM signal.

17. The communications system according to claim 15, wherein said signal is a DMT signal.

18. The communications system according to claim 15, further comprising:

a transmitter for transmitting a signal having at least one spectral null inserted therein.

19. The communications system according to claim 18, wherein said signal is an OFDM signal.

20. The communications system according to claim 18, wherein said signal is a DMT signal.

21. A communications system comprising:

a transmitter for transmitting a signal having at least one spectral null inserted therein for use by a receiver in acquiring a local oscillator carrier offset.

22. The communications system according to claim 21, wherein said signal is an OFDM signal.

23. The communications system according to claim 21, wherein said signal is a DMT signal.

24. An apparatus for acquiring a local oscillator carrier offset, comprising:

a memory device having embodied therein information relating to local oscillator carrier offset calculations; and a processor in communication with said memory device, said processor configured to receive a signal having at least one spectral null inserted therein, locate a position of said spectral null in said signal, and estimate said local oscillator carrier offset using said position of said spectral null.

25. An apparatus according to claim 24, wherein said signal is an OFDM signal.

26. An apparatus according to claim 24, wherein said signal is a DMT signal.

27. A method for acquiring a local oscillator carrier offset, comprising:

receiving a signal;

converting said signal from a time domain to a frequency domain;

locating a position of a spectral null in said converted signal; and using said position of said spectral null to estimate said local oscillator carrier offset.

28. A method for enabling a receiver to acquire a local oscillator carrier offset comprising:

adding a spectral null to a frequency domain representation of a signal for use by a receiver in acquiring a local oscillator carrier offset; and converting said frequency domain representation of said signal to a time domain representation of said signal for transmission to said receiver.

* * * * *